United States Patent
Chong et al.

(10) Patent No.: US 9,549,387 B2
(45) Date of Patent: Jan. 17, 2017

(54) TECHNIQUES FOR REDUCING INTERFERENCE IN COMMUNICATIONS USING CONDUCTED RF LINKS

(71) Applicant: Apple Inc., Cupertino, CA (US)

(72) Inventors: Chia-Yiaw Chong, San Jose, CA (US); Hsin-Yuo Liu, Fremont, CA (US); Mohit Narang, San Jose, CA (US); Peter M. Agboh, San Francisco, CA (US); Sathish Shanbhag Kota, San Jose, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/871,940

(22) Filed: Sep. 30, 2015

(65) Prior Publication Data

US 2016/0353402 A1   Dec. 1, 2016

Related U.S. Application Data

(60) Provisional application No. 62/168,277, filed on May 29, 2015.

(51) Int. Cl.
*H04B 15/02* (2006.01)
*H04W 64/00* (2009.01)

(52) U.S. Cl.
CPC ............. *H04W 64/00* (2013.01); *H04B 15/02* (2013.01)

(58) Field of Classification Search
CPC .................... H04B 15/02; H04W 64/00
See application file for complete search history.

(56) References Cited

U.S. PATENT DOCUMENTS

| | | | | |
|---|---|---|---|---|
| 5,970,413 A * | 10/1999 | Gilhousen | ............. | H04W 64/00 455/456.3 |
| 6,122,519 A * | 9/2000 | Tat | ......... | H04W 48/16 455/436 |
| 8,412,105 B2 | 4/2013 | Dorsey et al. | | |
| 8,599,709 B2 | 12/2013 | Chen et al. | | |
| 8,977,132 B2 | 3/2015 | Nielsen et al. | | |
| 9,019,915 B2 * | 4/2015 | Stephens | .......... | H04W 72/0453 370/329 |
| 9,071,977 B2 * | 6/2015 | Kim | ....... | H04W 16/14 |
| 9,408,063 B2 * | 8/2016 | Reshef | .................. | H04W 8/183 |
| 2007/0105576 A1 * | 5/2007 | Gupta | ................. | H04W 52/243 455/509 |
| 2007/0237121 A1 * | 10/2007 | Khandelwal | .......... | H04W 24/00 370/338 |
| 2008/0214174 A1 * | 9/2008 | Palenius | ............... | H04W 48/20 455/422.1 |
| 2012/0165003 A1 | 6/2012 | Kellett et al. | | |

(Continued)

*Primary Examiner* — Christopher M Brandt
(74) *Attorney, Agent, or Firm* — Fletcher Yoder PC

(57) ABSTRACT

The present techniques relate to reducing interference on conducted RF links by utilizing country information to determine where an electronic device is located, and using such information to select sub-bands or channels that are not available for wireless transmission to be used for transmission of signals via the conducted RF links. Because the conducted RF links operate on frequency bands that are different from the frequency bands used for wireless communications in a given country, there is less likelihood that wireless communications will create interference in the signals being transmitted via the conducted RF links.

18 Claims, 13 Drawing Sheets

(56) References Cited

U.S. PATENT DOCUMENTS

| | | | |
|---|---|---|---|
| 2013/0252627 A1* | 9/2013 | Luo | H04L 5/0032 |
| | | | 455/454 |
| 2014/0003606 A1 | 1/2014 | Birnbaum et al. | |
| 2016/0080929 A1* | 3/2016 | Reshef | H04W 8/183 |
| | | | 455/418 |

* cited by examiner

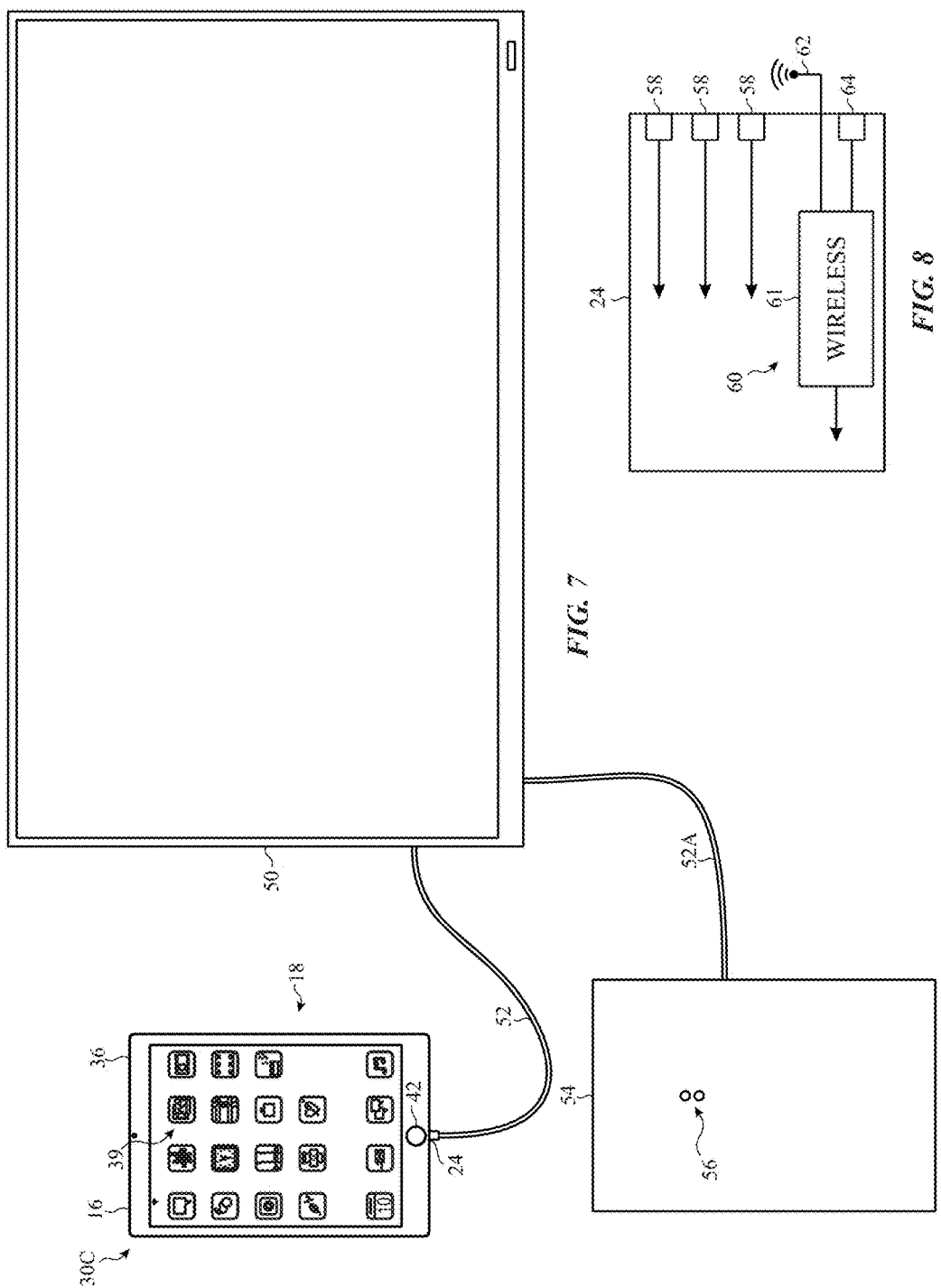

Configuration Scenarios

| | I | II | III | IV | V | VI | VII | VIII |
|---|---|---|---|---|---|---|---|---|
| | Active Radio | Accessory | CoEx Scenario | BT Radio Throughput (Mbps) | WiFi Radio Throughput (Mbps) | Conducted RF Throughput (Mbps) | SW1 | SW2 |
| | | | | | | | TDD Time Share | TDD Time Share |
| A | NA | using BT | / | / | / | 2.1 | 2 | 3 |
| | | using WiFi 2/5GHz | / | / | / | 60/320 | 3 | 1 |
| B | WiFi 2.4GHz | using BT | WiFi SISO Simultaneous Operation 1+1 | / | 60 | 2.1 | 2 | 2 |
| | | using WiFi 2GHz | MIMO TDD | / | Up to 120 | Up to 2.1 | 1/2 | 2/3 |
| | | using WiFi 5GHz | MIMO TDD | / | Up to 120 | Up to 60 | 1/2 | 2/3 |
| C | WiFi 5GHz | using BT | MIMO Simultaneous Operation | / | 550 | 2.1 | 1/3 | 2/1 |
| | | using WiFi 2GHz | MIMO TDD | / | Up to 550 | Up to 60 | 2 | 2 |
| | | using WiFi 5GHz | MIMO TDD | / | Up to 550 | Up to 320 | 3/2 | 2/3 |
| D | BT | using BT | BT TDD | Up to 2.1 | / | Up to 2.1 | 3 | 2/1 |
| | | using WiFi 2/5GHz | BT Simultaneous Operation 1+1 | 2.1 | / | 60/320 | 1/2 | 3 |
| | | | | | | | 1 | 1 |

*FIG. 14*

Configuration Scenarios

| I Active Radio | II Accessory | III Config Scenario | IV BT Radio Throughput (kbps) | V Wi-Fi Radio Throughput (Mbps) | VI Combined RF Throughput (Mbps) | VII TDD Time Slicer System 1 | VIII TDD Time Slicer System 2 |
|---|---|---|---|---|---|---|---|
| E | Inside BT | MIMO TDD | Up to 2.1 | Up to 120 | Up to 2.1 | 1/1/2 | 3/2/3 |
| E | Inside Wi-Fi 2.4GHz | MIMO TDD | 2.1* | Up to 120 | Up to 60 | 1/1/2 | 3/2/3 |
| E | Inside BT/Wi-Fi 2.4GHz | MIMO TDD | 2.1* | Up to 120 | Up to 320 | 1/1/3 | 3/2/1 |
| F | Inside BT | MIMO Simultaneous Operation | Up to 2.1 | 550 | Up to 2.1 | 1/1/2 | 2/2/2 |
| F | Inside Wi-Fi 2.4GHz | BT Simultaneous Operation + MIMO/TDD | 2.1 | Up to 550 | Up to 60 | 1/1/1 | 2/2/1 |
| F | Inside BT/Wi-Fi 2.4GHz | BT Simultaneous Operation + MIMO/TDD | 2.1 | Up to 550 | Up to 320 | 1/1/1 | 2/2/1 |

*Bluetooth high priority

*FIG. 15*

TECHNIQUES FOR REDUCING INTERFERENCE IN COMMUNICATIONS USING CONDUCTED RF LINKS

BACKGROUND

The present disclosure relates generally to techniques for facilitating communication between two electronic devices and, more particularly to, techniques for reducing interference in communications that utilize a conducted radio frequency (RF) link to facilitate communication between electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the marketplace today, there are a wide variety of electronic devices available for a wide variety of purposes. Such devices include cellular telephones, tablet computers, laptop computers, personal computers, televisions, headphones, Bluetooth® enabled watches, printers, and cameras, just to name a few. It is often desirable for one electronic device to communicate with one or more other electronic devices. Traditionally, such connections have been "hard-wired", such that the devices had to be connected directly to one another by some sort of cabling or by cabling via a network interface. Such cabling is typically terminated by standardized connectors (e.g., USB, RS232, etc.) or by proprietary connectors, e.g. Apple's Lightning® connector, etc. Hence, not only does the cabling solution require a plethora of unsightly wires, it often requires specific types of cables and/or adaptors because of the wide variety of connectors and signaling schemes.

In addition to some of these disadvantages, cables are subject to wear and tear. Their conductors and insulation can be damaged, and their connectors can break, corrode, or become too dirty to conduct signals properly. These problems tend to reduce the ability of the cables to send and receive signals accurately, thus limiting their speed and efficiency.

To address many of these concerns, various wireless technologies have become popular for facilitating communication between electronic devices. For example radio frequency (RF) technologies, such as WiFi (IEEE 802.11) and Bluetooth® (IEEE 802.15), are now commonly used by many electronic devices to facilitate communication without the need for cabling. Although such wireless interfaces address some of the problems with cabling, they are subject to their own disadvantages. For example, because wireless signals are transmitted through the air, they can be received by devices other than those intended by the user, thus creating potential security problems. Furthermore, because wireless signals typically need to be amplified more than signals that travel on an actual conductor, electronic devices typically utilize more power when communicating wirelessly, thus reducing battery life.

BRIEF DESCRIPTION OF THE DRAWINGS

Various aspects of this disclosure may be better understood upon reading the following detailed description and upon reference to the drawings in which:

FIG. 7 is a diagram illustrating a first electronic device, such as a tablet computer, communicating with a second electronic device, such as a television, via a conducted RF link;

FIG. 8 is a schematic diagram of one example of an I/O interface that includes one or more traditional ports along with one or more wireless links and conducted RF links;

FIG. 14 and FIG. 15 depict configuration scenarios for the RF circuit of FIG. 9;

DETAILED DESCRIPTION OF SPECIFIC EMBODIMENTS

Figure 1:
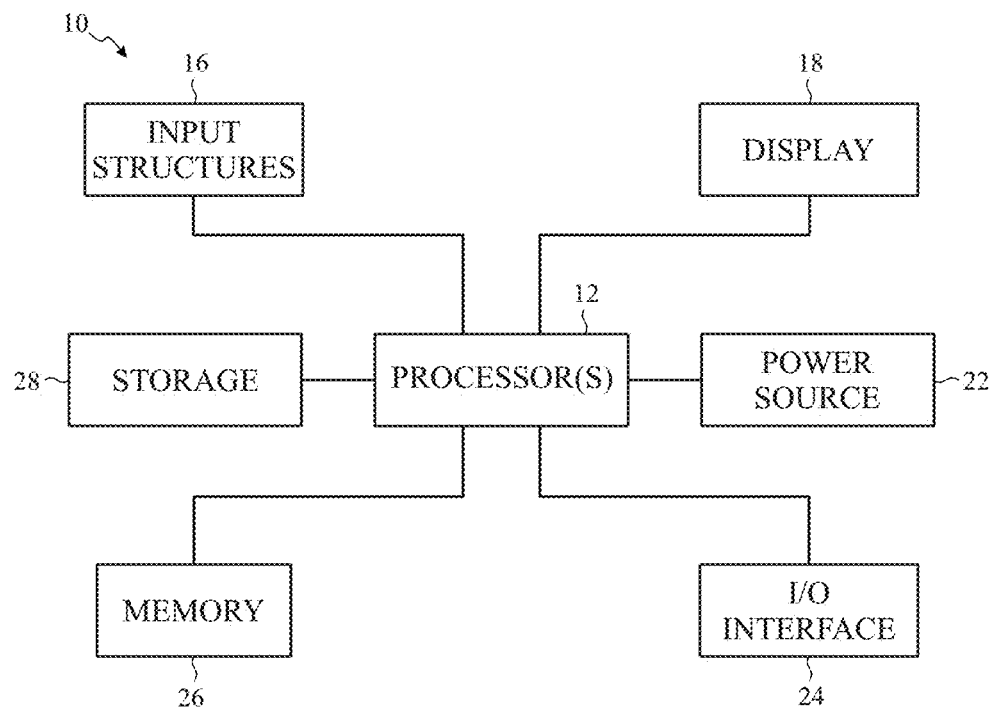
FIG. 1 is a schematic block diagram of an electronic device including display control circuitry, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

To address some of the concerns mentioned above, it is proposed to allow electronic devices to communicate with each other using a "conducted RF link." Such a conducted RF link is essentially a link that utilizes a conductor or cable that facilitates communication between electronic devices, but instead of the cable carrying a traditional signal it carries a modulated RF signal, such as those produced by a typical wireless RF radio like presently available WiFi / Bluetooth® cores. Because the signal is transmitted via a conductor as opposed to an air interface, it does not require the amount of amplification of a wireless signal, thus saving power compared to wireless communication. Furthermore, since the signal is not transmitted over the air, wireless security problems are not an issue. In addition, because a conducted RF link uses only a very simple connector scheme (only one conductor for the signal and another conductor for ground), many problems related to standardized and proprietary connectors are overcome. Indeed, because of the simplicity of the connection scheme, electronic devices can have surface contacts so that one merely places one electronic device on the surface of the other to facilitate the conducted RF connection.

As discussed in greater detail below, some of the techniques for providing communications using a conducted RF link also provide wireless communications. Because these communications may take place at the same time over the same frequency band (2.4 GHz or 5 GHz), radiation from the conducted RF link could unintentionally interfere with a wireless communication, or vice versa. Furthermore, radiation from other emitters, such as other electronic devices or neighboring networks that are operating in the same frequency band, could unintentionally interfere with communications taking place via a conducted RF link. However, most countries limit the sub-bands or channels that electronic devices may use to transmit wireless signals. Despite that, the wireless modules used on most electronic devices are capable of operating on all sub-bands or channels. Hence, the present techniques for reducing interference on conducted RF links involve utilizing country information to determine where an electronic device is located, and using such information to select sub-bands that are not available for wireless transmission to be used for transmission of signals via the conducted RF links. Because the conducted RF links operate on frequency bands that are different from the frequency bands used for wireless communications in a given country, there is less likelihood that wireless communications will create interference in the signals being transmitted via the conducted RF links.

Another technique for reducing interference on conducted RF links involves a determination of active wireless channels in an electronic device. For example, the device can determine whether there are any active cellular, WiFi, and/or Bluetooth channels. If so, any active channels can be removed from a list of possible channels that can be used for generating the RF signals for the conducted RF link. If any idle channels remain available, one or more may be selected for use for the conducted RF link, and those idle channels having a higher offset from any active channels may be given a greater weight in the selection since they should be less likely to be subject to interference. If not, one of the least crowded active channels may be selected for use for the conducted RF link.

With these features in mind, a general description of suitable electronic devices that may use conducted RF links is provided. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24 and a power source 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

Figure 2:
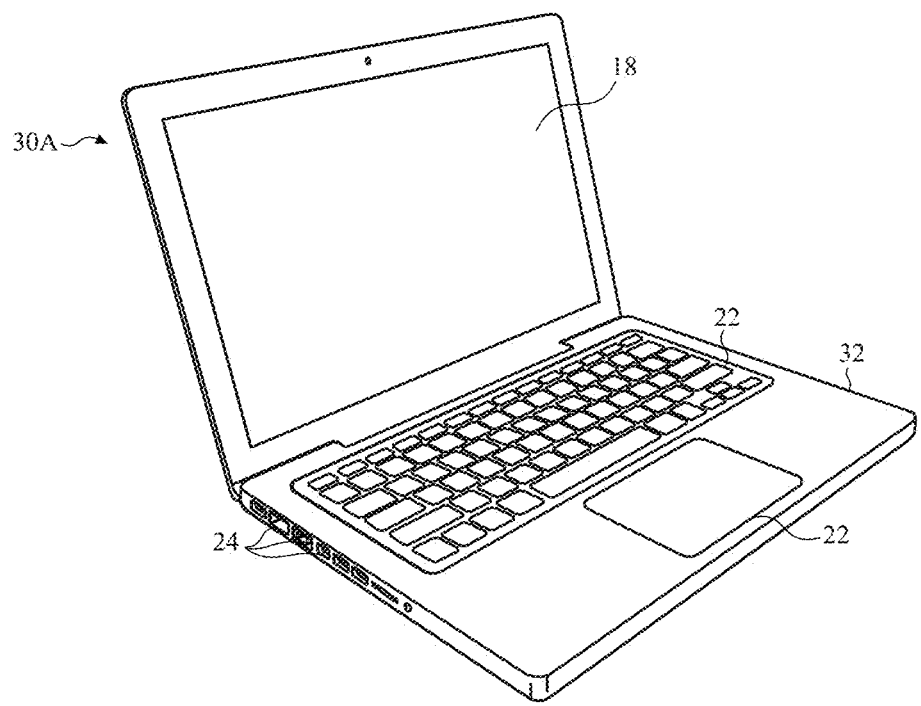
FIG. 2 is a perspective view of a notebook computer representing an embodiment of the electronic device of FIG. 1, in accordance with an embodiment.
Figure 3:
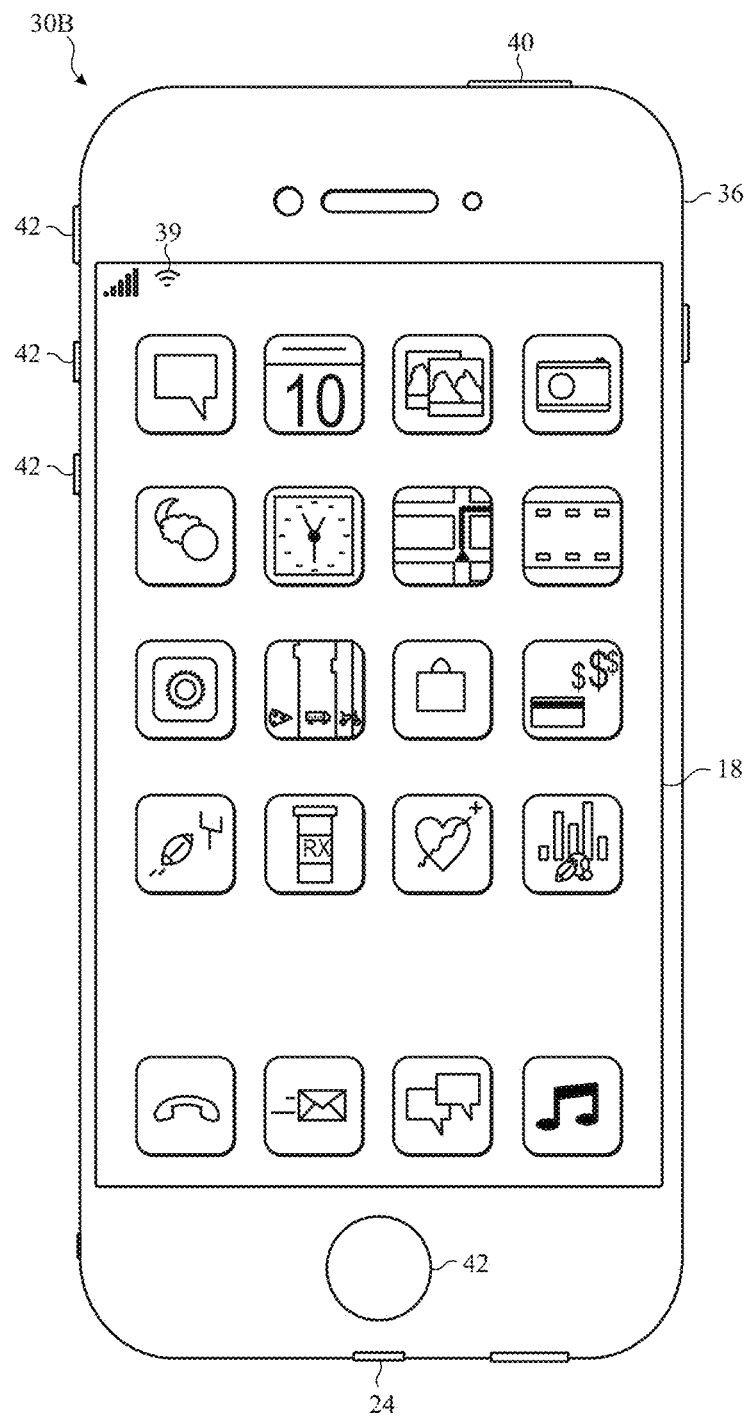
FIG. 3 is a front view of a hand-held device representing another embodiment of the electronic device of FIG. 1, in accordance with an embodiment.
Figure 4:
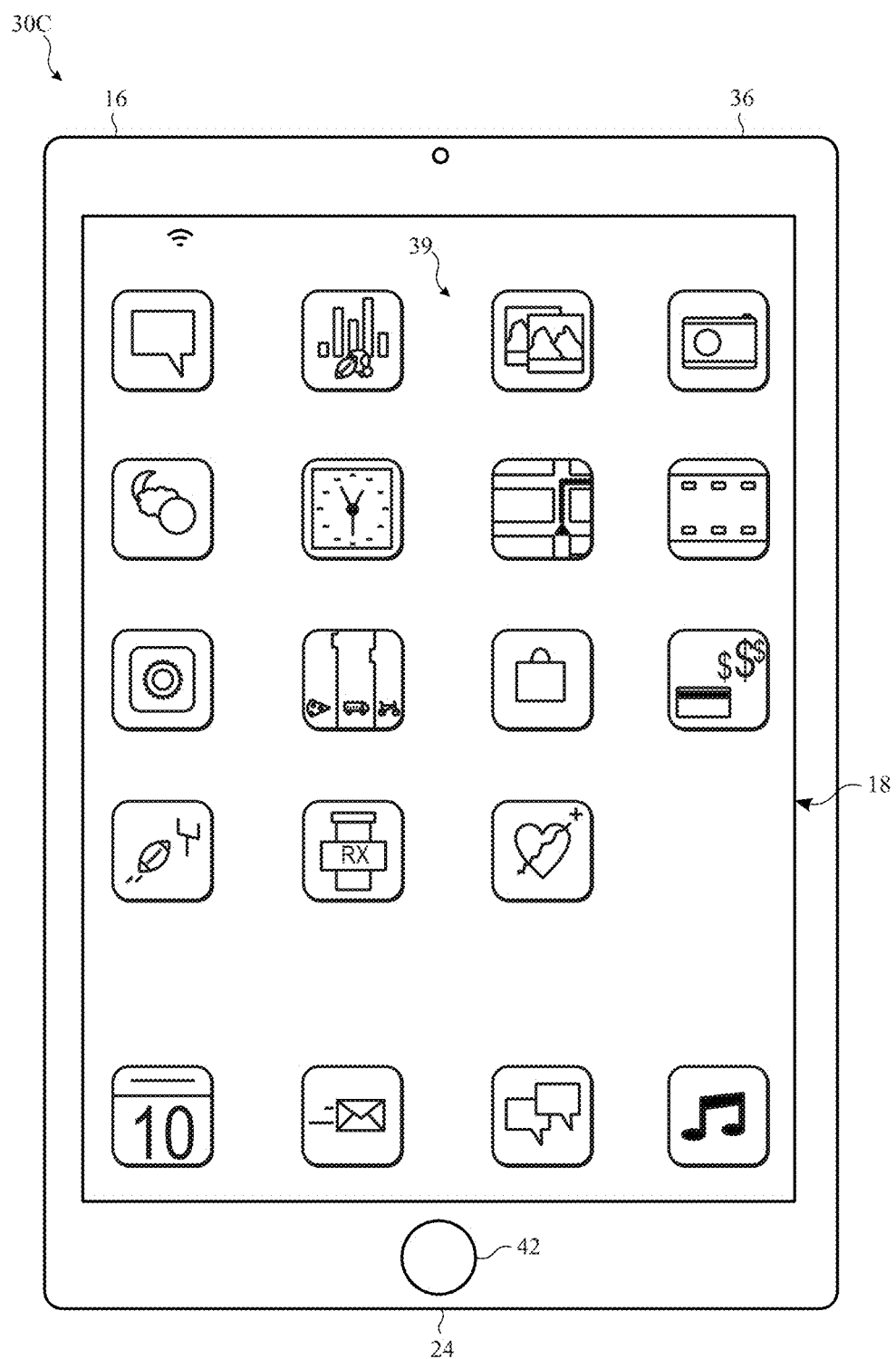
FIG. 4 is a front view of another hand-held device representing another embodiment of the electronic device of FIG. 1, in accordance with an embodiment.
Figure 5:
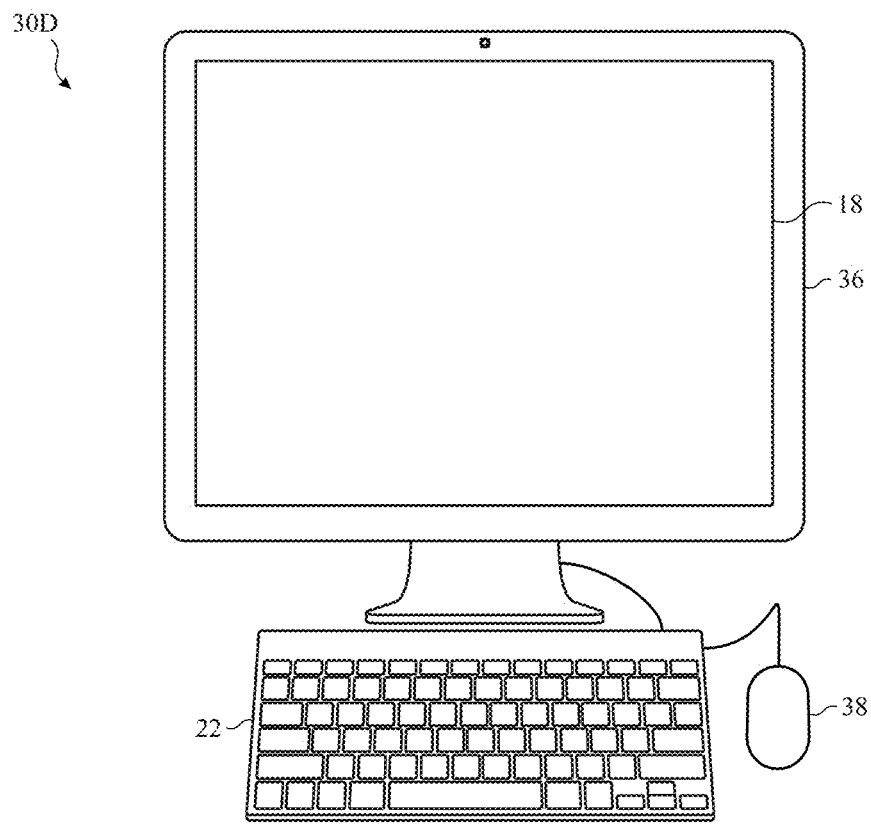
FIG. 5 is a front view of a desktop computer representing another embodiment of the electronic device of FIG. 1, in accordance with an embodiment.
Figure 6:
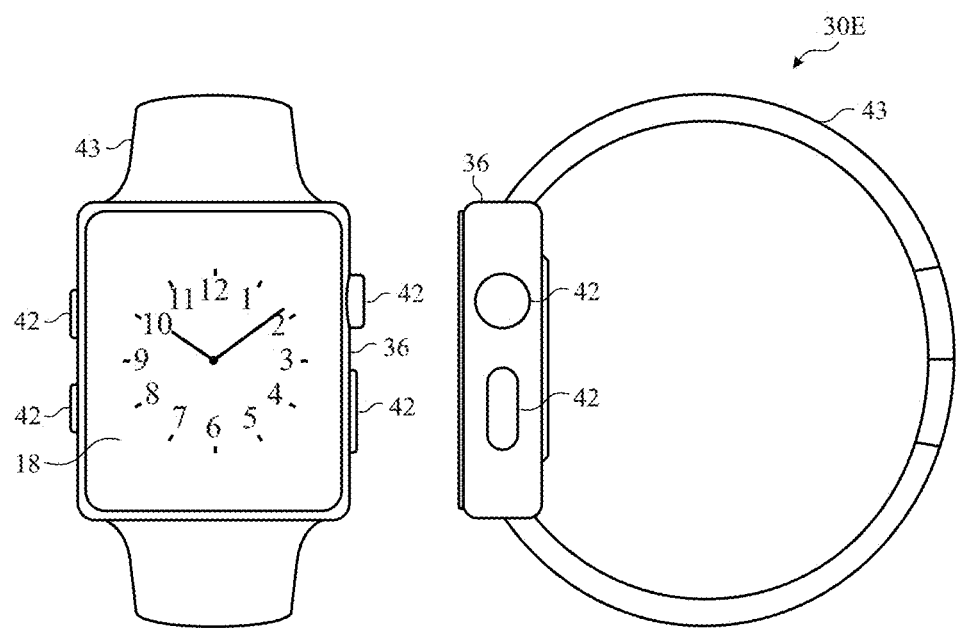
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG.6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the non-volatile storage 16 may include any suitable articles of manufacture for storing data and executable instructions, such as random-access memory, read-only memory, rewritable flash memory, hard drives, and optical discs. Also, programs (e.g., e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED, OLED, AMOLED, etc.) displays, or some combination of LCD panels and LED panels.

The input structures 22 of the electronic device 10 may enable a user to interact with the electronic device 10 (e.g., e.g., pressing a button to increase or decrease a volume level). The I/O interface 24 may enable electronic device 10 to interface with various other electronic devices. The I/O interface 24 may include various types of ports that may be connected to cabling. These ports may include standardized and/or proprietary ports, such as USB, RS232, Apple's Lightening® connector, as well as one or more ports for a conducted RF link. The I/O interface 24 may also include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a 3rd generation (e.g., 3G) cellular network, 4th generation (e.g., 4G) cellular network, or long term evolution (e.g., LTE) cellular network. The I/O interface 24 may also include interfaces for, for example, broadband fixed wireless access networks (e.g., WiMAX), mobile broadband Wireless networks (e.g., mobile WiMAX), and so forth.

As further illustrated, the electronic device 10 may include a power source 26. The power source 26 may include any suitable source of power, such as a rechargeable lithium polymer (e.g., Li-poly) battery and/or an alternating current (e.g., AC) power converter. The power source 26 may be removable, such as replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include housing or enclosure 32, a display 18, input structures 22, and ports of the I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 38 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal service bus (e.g., USB), one or more conducted RF connectors, or other connectors and protocols.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 22 or mouse 38, which may connect to the computer 30D via a wired and/or wireless I/O interface 24.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, OLED display, active-matrix organic light emitting diode (e.g., AMOLED) display, and so forth), which may allow users to interact with a user interface of the wearable electronic device 30E.

As mentioned previously, it is often desirable for various electronic devices to communicate with one another. In view of the various disadvantages associated with traditional cabling and wireless solutions, many situations may arise where a conducted RF link represents a desirable alternative to facilitate such communication. Indeed in a communication scenario that would benefit from relatively high bandwidth and relatively low power consumption, a conducted RF link represents a good option. One such example is illustrated in FIG. 7, where a video that is stored on or is streaming from a tablet computing device 30C is coupled to a television 50 via a conducted RF link 52. In this example, a relatively simple cable may be run between the I/O interface 24 of the tablet computer 30C to an appropriate input of the television 50, as illustrated. Alternatively, a pad 54 may be coupled to an appropriate input of the television 50 by a conducted RF link 52A. The pad 54 may include surface contacts 56 that may interface with surface contacts (not shown) on the back of the tablet computer 30C, or other electronic device, so that the tablet computer 30C may simply be laid upon the pad 54 such that its surface contacts align with the contacts 56 to facilitate the conducted RF communication.

Figure 9:
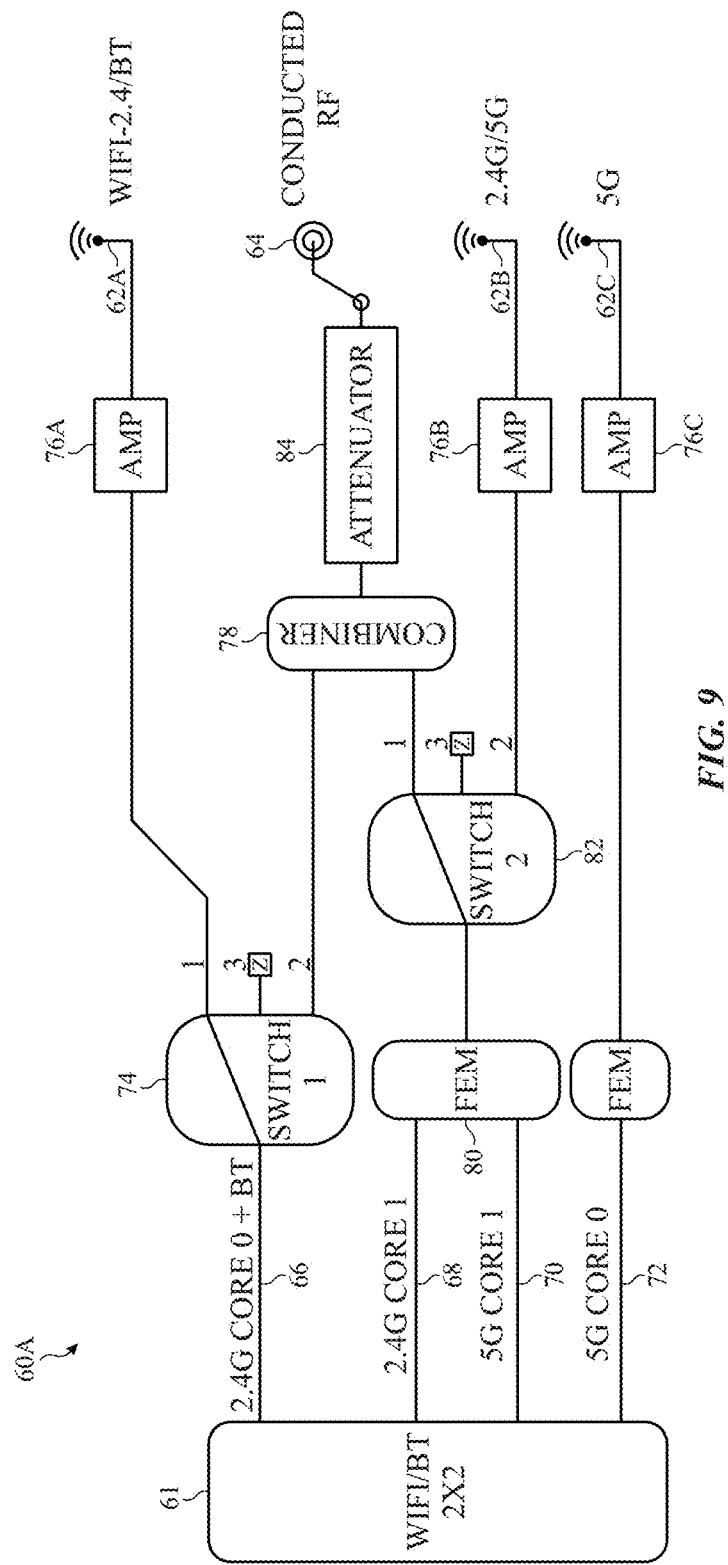
FIG. 9 is a schematic diagram of an example an RF circuit that facilitates both wireless communication and conducted RF communication.

As illustrated in FIG. 8, to provide various communication options, the I/O interface 24 of the electronic device 10 may include a variety of traditional conductive ports 58 as well as a wireless communications device such as a wireless module 60. The wireless module 60 may include one or more wireless cores 61 that may be coupled to one or more antennae 62 and one or more conductive RF ports 64. FIG. 9 illustrates one example of a wireless module 60A, which includes a WiFi/Bluetooth® 2×2 core 61 that feeds three antennas 62A, 62B and 62C and one conducted RF port 64. As can be seen, the WiFi/Bluetooth® core 61 can output a 2.4 GHz signal or Bluetooth® signal from core 0 on line 66, a 2.4GHz signal from core 1 on line 68, a 5 GHz signal from core 1 on line 70, and a 5 GHz signal from core 0 on line 72. A first switch 74 can deliver the 2.4 GHz WiFi signal or Bluetooth® signal from core 0 through an amplifier 76A to the antenna 62A or through a combiner 78 to the conducted RF port 64. The 2.4 GHz and 5 GHz signals from core 1 on lines 68 and 70 may be delivered through a multiplexor 80 to a second switch 82. The switch 82 may deliver one of these WiFi signals through the combiner 78 to the conducted RF port 64, or through an amplifier 76B to the second antenna 62B. The 5 GHz signal from core 0 on line 72 may be delivered through an amplifier 76C to the third antenna 62C.

As mentioned previously, one of the advantages of communicating using the conducted RF link is that it may use less power than communicating wirelessly because the RF signal produced by the core 61 may not need to be amplified prior to transmission. Indeed, in some circumstances the RF signal produced by the core 61 may be attenuated using an attenuator 84 prior to transmission via the conducted RF port 64. For example, a −10 dB attenuator may be used. To provide further power savings, the amplifiers 76A, 76B, and/or 76C may be turned off during periods when signals are being provided via the conducted RF port 64 rather than the respective antennas 62A, 62B, and 62C.

Figure 10:
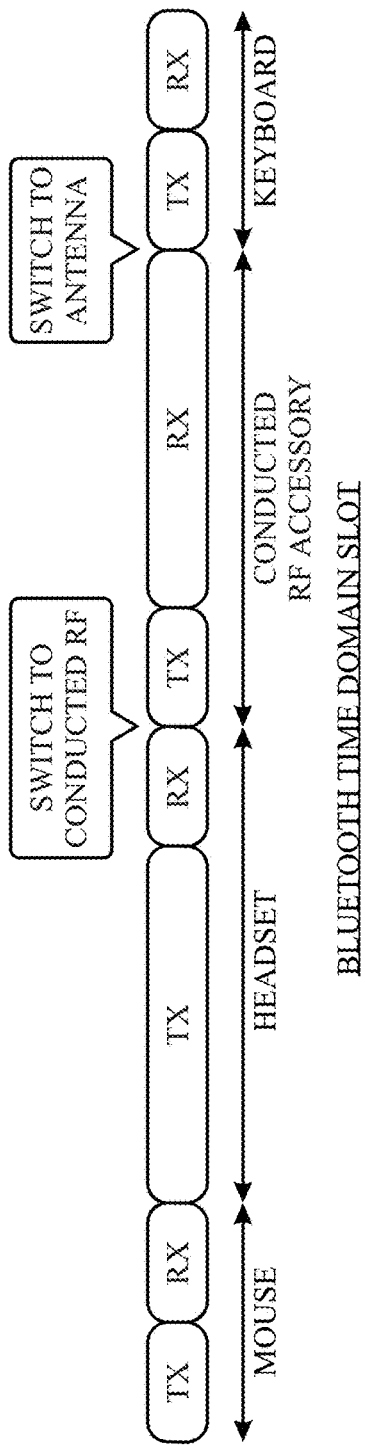
FIG. 10 is a diagram illustrating an example of a Bluetooth® time domain slot for wireless and conducted RF communication.
Figure 11:
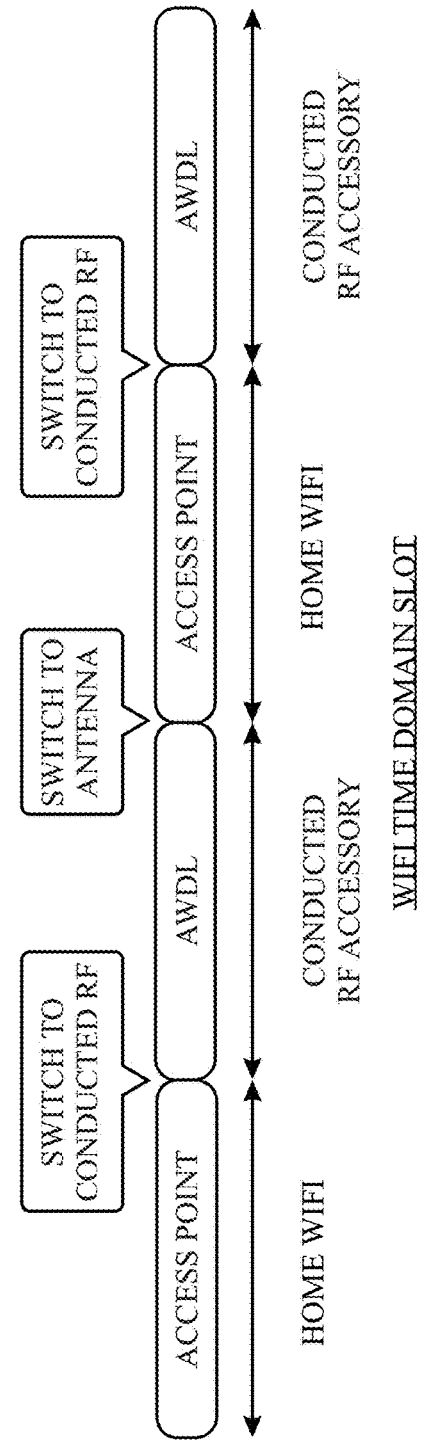
FIG. 11 is diagram illustrating an example of a WiFi time domain slot for wireless and conducted RF communication.
Figure 12:
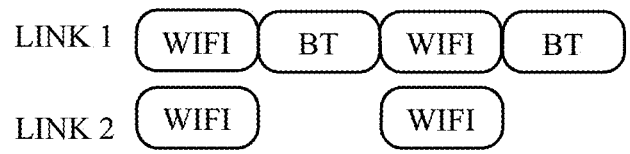
FIG. 12 is a diagram illustrating an example of a multiple in multiple out (MIMO) time division duplex scheme for the circuit illustrated in FIG. 11.
Figure 13:
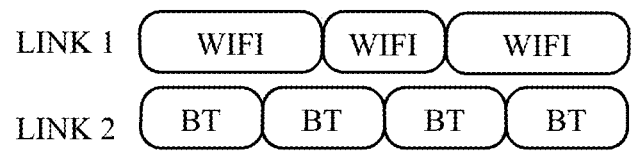
FIG. 13 is a diagram illustrating an example of a single in single out (SISO) communication scheme for the circuitry illustrated in FIG. 11.

The wireless module 60A can operate in different modes, depending upon the positions of the switches 74 and 82. For example, the wireless module 60A can operate in single in, single out (SISO) mode where one link outputs WiFi and the other link outputs Bluetooth®. Alternatively, the wireless module 60 can operate in multiple in, multiple out (MIMO), where both links can output WiFi simultaneously. FIG. 10 illustrates one example in which the first switch 74 is operating the Bluetooth® link in a time division duplex fashion. As illustrated, the switch 74 may be in position 1 while communicating with a wireless mouse and a wireless headset via the antenna 62A, and then switch to position 2 to communicate with a conducted RF accessory via the conducted RF port 64. Similarly, FIG. 11 illustrates a conducted RF accessory running on a WiFi link, such as an Apple wireless direct link. In this situation, the second switch 82 is in position 2 while communicating with the home WiFi, and then switches to position 1 to communicate with the conducted RF accessory. In the example illustrated in FIG. 12, at any given time either the conducted RF Bluetooth® accessory is active or WiFi MIMO is active. Similarly, as illustrated in FIG. 13, the WiFi may operate in SISO and the conducted Bluetooth® accessory will operate at the same time.

It should be understood that the wireless module 60A and the manner in which it operates as described with respect to FIGS. 9-13 above represents merely a single set of examples of how the wireless module 60 may be structured and may operate. Indeed, it should be understood that using a 2×2 core 61, the wireless module 60 may include up to four antennas 62 and up to four conducted RF ports 64.

It should also be understood that various configuration scenarios may be envisioned, with respect to the wireless module 60A illustrated in FIG. 9, for example, depending upon which radio is active, the coexistence scenario, and the switch positions, and that these different configuration scenarios can affect the bandwidth or throughput of the wireless links and the conducted RF link. Various configuration scenarios are illustrated in FIGS. 14 and 15. These configuration scenarios are discussed in detail in U.S. patent application Ser. No. 14/871,903, filed on Sep. 30, 2015, entitled Techniques for Communicating using Conducted RF Links, by Liu, Sen, Narang, Agboh and Caballero, which is incorporated by reference herein in its entirety for all purposes.

Finally, it should be understood that the accessories that may be used to communicate with the electronic device via the conducted RF link 64 may include a suitable demodulator that receives the modulated analog RF signal and demodulates it to recover the digital signal that is being transmitted between the devices, as well as a suitable modulator for converting digital data to a modulated analog RF signal so that it can be transmitted back to the device 10 via a conducted RF link. Similarly, although it is not shown, the wireless module 60 may include a demodulator for receiving the RF signal transmitted back to the electronic device 10 from the accessory.

Figure 16:
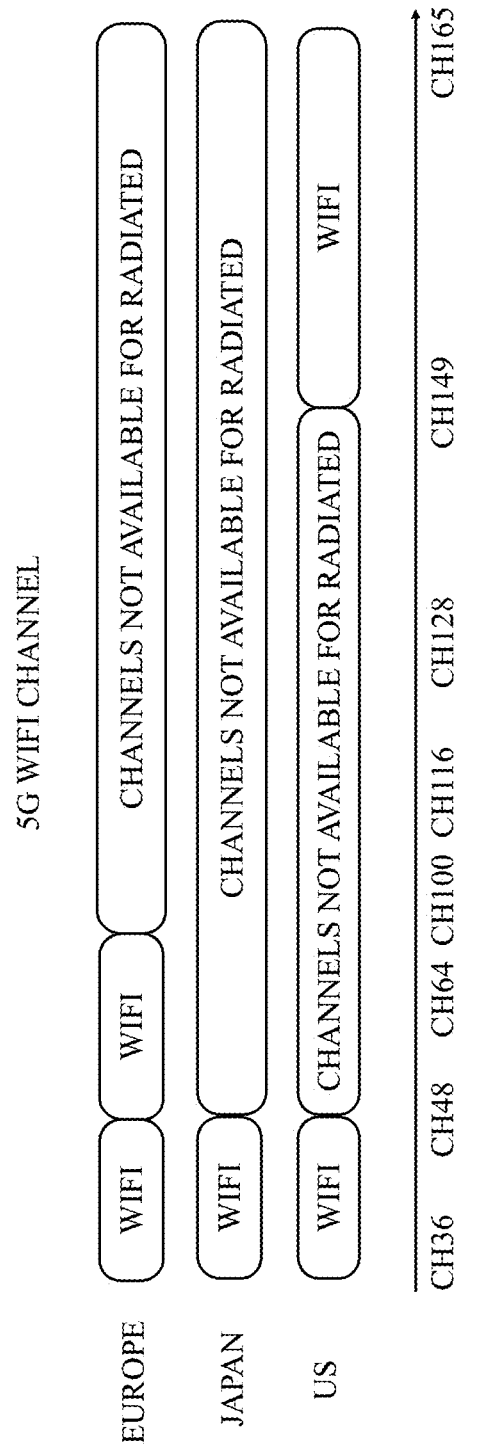
FIG. 16 is a diagram illustrating WiFi channels allowed in various countries.

It should be appreciated that if the core 61 of the wireless module 60 generates RF signals on the conducted RF port 64 in the same sub-band or channel as RF signals it generates for transmission via the antennae 62, the RF signals on the wireless links could cause interference with the RF signals on the conducted RF links and vice versa. However, as previously mentioned, most countries allow for wireless transmission only on certain sub-bands or channels, with the other channels remaining unused for wireless transmission. One example is illustrated in FIG. 16, which shows the approved channels in Europe, Japan, and the United States for 5 GHz WiFi. Information of this type may be stored in a list or table, for example, of the electronic device 10, or it could be accessible by the electronic device via cloud storage for example. Indeed, such information may be stored on the wireless module 60. Hence, to reduce interference of RF signals transmitted via conducted RF links, such information may be used to select sub-bands or channels that are not allowed for wireless transmission in a particular country to be used for RF signals generated and transmitted via the conducted RF links.

Figure 17:
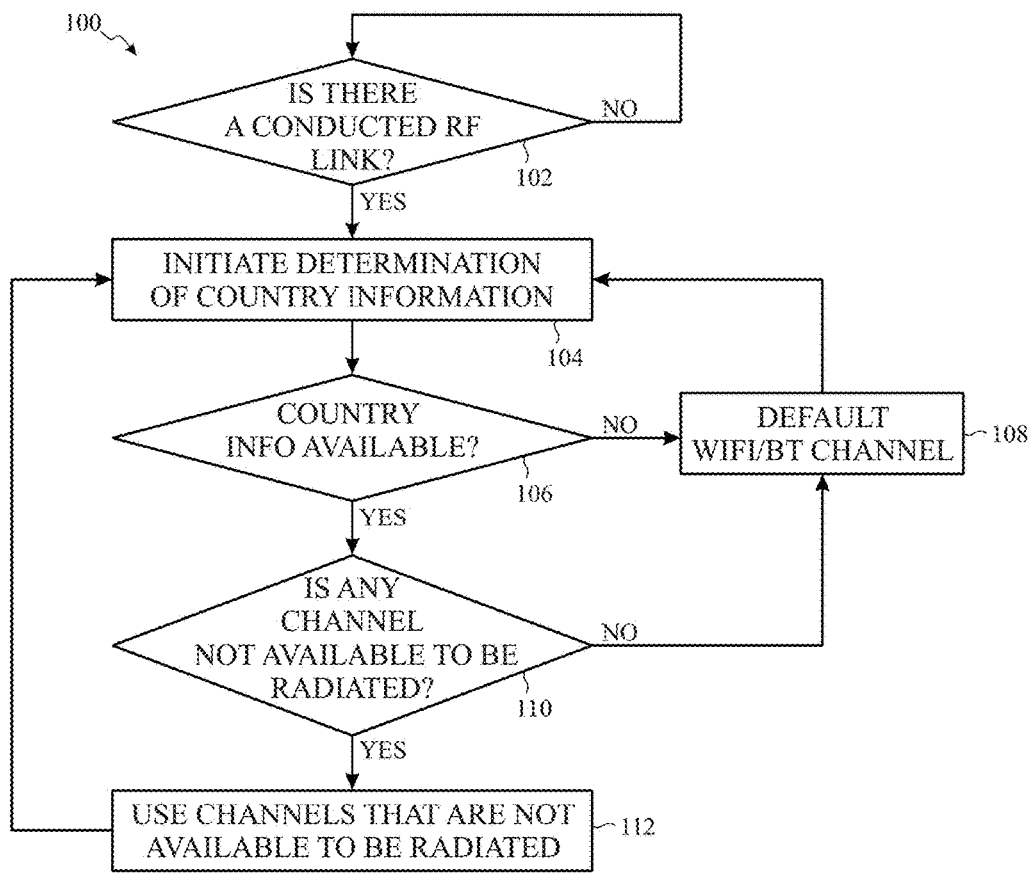
FIG. 17 is a flow diagram depicting a technique for selecting a channel for a conducted RF link.

Referring to FIG. 17 as well, a co-existence mitigation algorithm 100 is illustrated to facilitate the selection of an available channel to be used for transmission of information via a conducted RF link. When a conducted RF link is discovered (block 102), it generates a trigger event that causes the country information or a change of country information to be determined (block 104). For example, the location of the electronic device 10 may be determined using any of a variety of techniques, including for example, its GPS location, the location of cellular towers with which it is in communication, etc. If the location or country information for the electronic device 10 cannot be determined (block 106), then a default WiFi or Bluetooth® channel is selected (block 108). However, if the location or country information for the electronic device 10 is available, it is determined whether any sub-bands or channels exist that are not available to be radiated for wireless transmissions, by accessing the table or cloud storage for example as mentioned above (block 110). Indeed, if the table is stored on the wireless module 60, the wireless module 60 may be configured to receive the location information, from the GPS of the device 10 for example, and determine which RF channels may be used for radiation via the antenna 62 and which RF channels may be used for the conducted RF link 64. If no such channels are available, then again a default channel is selected (block 108). However, if one or more sub-bands or channels are available, one or more of the sub-bands or channels is selected to use for RF signal generation and transmission via the conducted RF links (block 112). For example, unavailable channels having a higher offset from any channels that are available for radiated RF transmission may be given a greater weight in the selection since they should be less likely to be subject to interference.

Figure 18:
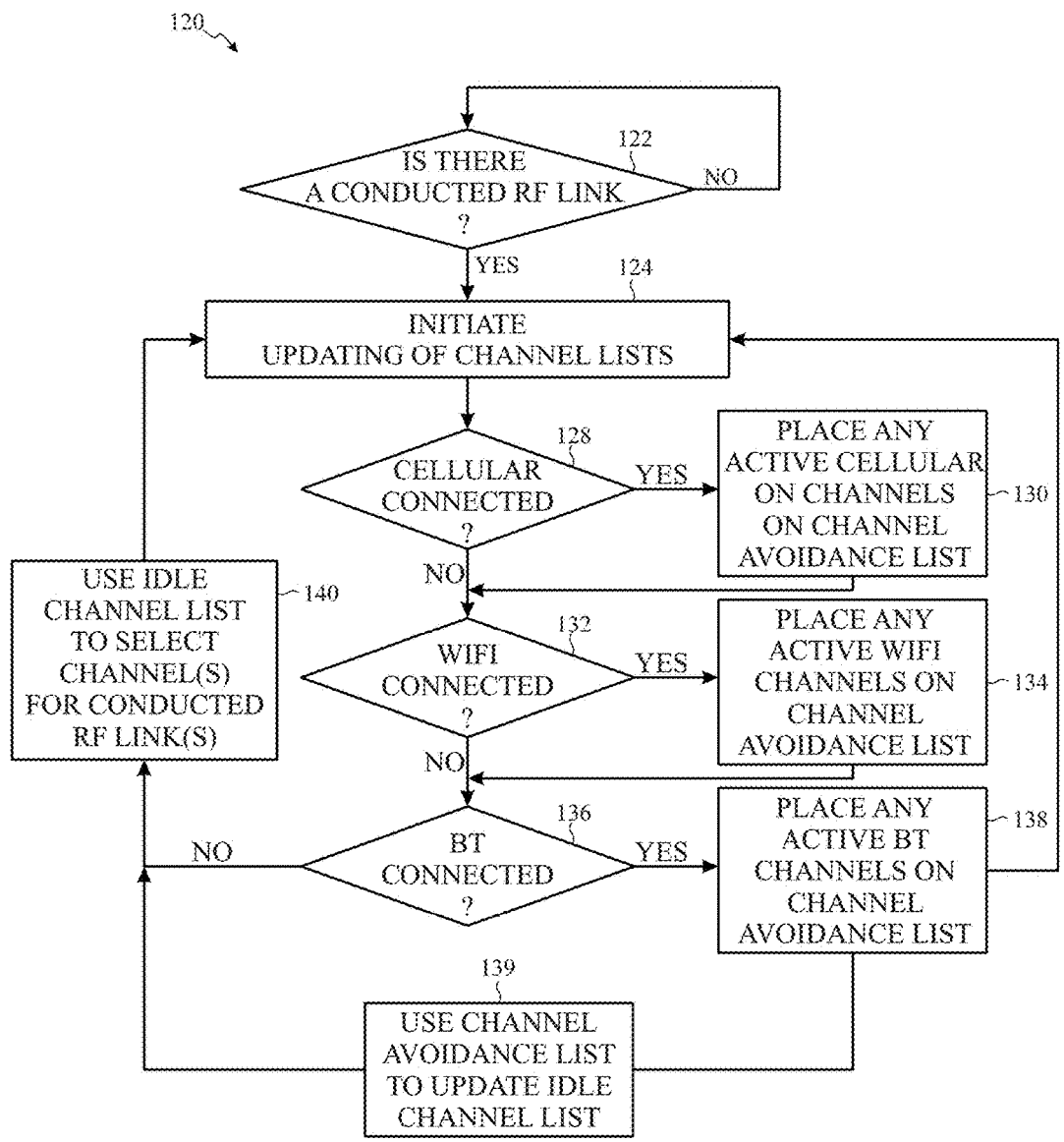
FIG. 18 is a flow diagram depicting another technique for selecting a channel for a conducted RF link.

As mentioned above, the device 10 may determine whether there are any active cellular, WiFi, and/or Bluetooth channels and, based at least in part on that determination, select one or more channels for use for the conducted RF link to reduce interference. Referring to FIG. 18, another co-existence mitigation algorithm, such as a smart link selection algorithm 120, is illustrated to facilitate the selection of an available channel to be used for transmission of information via a conducted RF link. When a conducted RF link is discovered (block 122), it generates a trigger event that initiates the determination and updating of an Idle Channel List and a list of existing active wireless channels, e.g., a Channel Avoidance List (block 124). As illustrated, if the cellular is connected, the active cellular channels may be placed on the Channel Avoidance List (blocks 128 and 130). Similarly, if the WiFi is connected, the active channels can be placed on the Channel Avoidance List (blocks 132 and 134), and if the Bluetooth is connected, the existing channel masks (due to frequency hopping) can be placed on the Channel Avoidance List (blocks 136 and 138). Using the Channel Avoidance List, the Idle Channels List can be updated (block 139), and the updated Idle Channel List may be used to select an appropriate inactive RF channel for use of the conducted RF link 64 (block 140). If a plurality of idle channels remains available, one or more may be selected for use for the conducted RF link, and those idle channels having a higher offset from any active channels may be given a greater weight in the selection since they should be less likely to be subject to interference. If not, one of the least crowded active channels may be selected for use for the conducted RF link.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for reducing interference in a conducted radio frequency (RF) link, the method comprising:
   determining country information for an electronic device having a conducted RF link;
   based on the country information, determining if any RF channels are not available to be radiated for wireless communications; and
   if an unavailable RF channel exists, using the unavailable RF channel for RF signal generation and transmission over the conducted RF link.

2. The method, as set forth in claim 1, wherein determining country information comprises:
   determining a location of the electronic device using a global positioning system (GPS).

3. The method, as set forth in claim 1, wherein determining country information comprises:
   determining a location of the electronic device by determining a location of cellular towers with which the electronic device is communicating.

4. The method, as set forth in claim 1, wherein determining if any RF channels are not available comprises:
   accessing a list of unavailable channels for a country corresponding to a present location of the electronic device.

5. The method, as set forth in claim 4, wherein the list is stored on the electronic device.

6. The method, as set forth in claim 4, wherein the list is accessible to the electronic device via cloud storage.

7. The method, as set forth in claim 1, wherein if a plurality of unavailable RF channels exist, selecting one or more of the unavailable RF channels for RF signal generation and transmission over the conducted RF link.

8. The method, as set forth in claim 7, wherein unavailable RF channels having a higher offset from any RF channels that are available for radiated RF transmission given a greater weight when selecting one or more of the unavailable RF channels for RF signal generation and transmission over the conducted RF link.

9. An electronic device comprising:
   a wireless communications device having at least one antenna configured for wireless communications and having at least one conducted RF link;
   data processing circuitry operably coupled to the wireless communications device, wherein the data processing circuitry is configured to:
   determine a location of the electronic device;
   based on the location of the electronic device, determine if any RF channels are not available to be radiated for wireless communications via the at least one antenna; and
   if an unavailable RF channel exists, cause the wireless communications device to use the unavailable RF channel for RF signal generation and transmission over the at least one conducted RF link.

10. The electronic device, as set forth in claim 9, wherein the data processing circuitry determines the location of the electronic device using a global positioning system (GPS).

11. The electronic device, as set forth in claim 9, wherein the data processing circuitry determines the location of the electronic device by determining a location of cellular towers with which the electronic device is communicating.

12. The electronic device, as set forth in claim 9, wherein the data processing circuitry comprises a memory storing a table of countries and unavailable RF channels corresponding to each country, and wherein the data processing circuitry determines if any RF channels are not available by accessing the table and list of unavailable channels for a country corresponding to the location of the electronic device.

13. The electronic device, as set forth in claim 9, wherein cloud storage stores a table of countries and unavailable RF channels corresponding to each country, where wherein the data processing circuitry determines if any RF channels are not available by accessing the table and list of unavailable channels for a country corresponding to the location of the electronic device.

14. The electronic device, as set forth in claim 9, wherein if a plurality of unavailable RF channels exist, the data processing circuitry is configured to cause the wireless communications device to use one or more of the unavailable RF channels for RF signal generation and transmission over the at least one conducted RF link.

15. The electronic device, as set forth in claim 14, wherein the data processing circuitry is configured to give unavailable RF channels having a higher offset from any RF channels that are available for radiated RF transmission a greater weight when selecting one or more of the unavailable RF channels for the wireless communications device to use for RF signal generation and transmission over the at least one conducted RF link.

16. A wireless communications device comprising:
at least one wireless core coupled to at least one antenna and at least one conducted RF link, the at least one wireless core being configured to generate RF signals based on country information such that at least one available RF channel in a given country is used to generate RF signals to the at least one antenna and at least one unavailable RF channel in the given country is used to generate RF signals to the at least one conducted RF link.

17. The wireless communications device, as set forth in claim 16, comprising a memory storing a table of countries and unavailable RF channels corresponding to each country, and wherein the at least one wireless core determines if any RF channels are not available by accessing the table and list of unavailable channels for a country corresponding to a location of the wireless communications device.

18. The wireless communications device, as set forth in claim 17, wherein the at least one wireless core is configured to receive an input corresponding to the location and to access the table and list of unavailable channels for the country corresponding to the location of the wireless communications device.

\* \* \* \* \*